United States Patent
Chen et al.

(10) Patent No.: US 12,482,060 B2
(45) Date of Patent: Nov. 25, 2025

(54) PANORAMIC VIDEO FRAME INTERPOLATION METHOD AND APPARATUS, AND CORRESPONDING STORAGE MEDIUM

(71) Applicant: KANDAO TECHNOLOGY CO., LTD., Shenzhen (CN)

(72) Inventors: Dan Chen, Shenzhen (CN); Yuyao Zhang, Shenzhen (CN); Zhigang Tan, Shenzhen (CN)

(73) Assignee: KANDAO TECHNOLOGY CO., LTD., Shenzhen (CN)

( * ) Notice: Subject to any disclaimer, the term of this patent is extended or adjusted under 35 U.S.C. 154(b) by 501 days.

(21) Appl. No.: 18/041,802

(22) PCT Filed: Apr. 19, 2021

(86) PCT No.: PCT/CN2021/088004
§ 371 (c)(1),
(2) Date: Feb. 16, 2023

(87) PCT Pub. No.: WO2021/238500
PCT Pub. Date: Dec. 2, 2021

(65) Prior Publication Data
US 2023/0316456 A1  Oct. 5, 2023

(30) Foreign Application Priority Data
May 26, 2020  (CN) .......................... 202010452273.5

(51) Int. Cl.
G06T 3/4038  (2024.01)
G06T 3/4007  (2024.01)
(Continued)

(52) U.S. Cl.
CPC .......... G06T 3/4038 (2013.01); G06T 3/4007 (2013.01); G06T 3/4046 (2013.01);
(Continued)

(58) Field of Classification Search
CPC ... G06T 3/4038; G06T 3/4007; G06T 3/4046; G06T 5/10; G06T 5/50; G06T 7/20;
(Continued)

(56) References Cited

U.S. PATENT DOCUMENTS

2006/0039471 A1 *  2/2006  Dane ................... H04N 19/132
                                                         375/E7.181
2010/0034448 A1    2/2010  Lee
(Continued)

FOREIGN PATENT DOCUMENTS

CN  107403408 A  * 11/2017
CN  107845109 A  *  3/2018
(Continued)

OTHER PUBLICATIONS

Internation Search Report of PCT/CN2021/088004, Mailed Jul. 15, 2021.

*Primary Examiner* — Henok Shiferaw
*Assistant Examiner* — Woo C Rhim

(57) ABSTRACT

The present invention provides a panoramic video frame interpolation method, including outputting a pre-post frame image optical flow graph and a post-pre frame image optical flow graph; calculating an image optical flow graph before frame interpolation and an image optical flow graph after frame interpolation; obtaining a downsampling pre-frame image after transformation and a downsampling post-frame image after transformation; outputting a pre-post frame image correction optical flow graph, a post-pre frame image correction optical flow graph and an image occlusion relationship graph; obtaining a downsampling pre-frame image after correction and a downsampling post-frame image after correction; obtaining an upsampling image optical flow graph before frame interpolation and an upsampling image optical flow graph after frame interpolation; and calculating (Continued)

a frame interpolation image corresponding to a frame interpolation position.

11 Claims, 12 Drawing Sheets

(51) Int. Cl.
*G06T 3/4046* (2024.01)
*G06T 5/10* (2006.01)
*G06T 5/50* (2006.01)
*G06T 7/20* (2017.01)

(52) U.S. Cl.
CPC .................. *G06T 5/10* (2013.01); *G06T 5/50* (2013.01); *G06T 7/20* (2013.01); *G06T 2207/10016* (2013.01); *G06T 2207/20048* (2013.01); *G06T 2207/20084* (2013.01); *G06T 2207/20212* (2013.01)

(58) Field of Classification Search
CPC . G06T 2207/10016; G06T 2207/20048; G06T 2207/20084; G06T 2207/20212; H04N 19/587
See application file for complete search history.

(56) References Cited

U.S. PATENT DOCUMENTS

| | | | | |
|---|---|---|---|---|
| 2014/0307045 A1* | 10/2014 | Richardt | ............... | G06T 3/4038 348/36 |
| 2018/0091768 A1 | 3/2018 | Adsumilli et al. | | |
| 2020/0314340 A1 | 10/2020 | Chen et al. | | |
| 2021/0295467 A1* | 9/2021 | Rao | ............. | G06T 7/70 |
| 2023/0316456 A1* | 10/2023 | Chen | ..................... | G06T 3/4007 382/156 |

FOREIGN PATENT DOCUMENTS

| | | | | | |
|---|---|---|---|---|---|
| CN | 108040217 A | * | 5/2018 | ........... | H04N 19/521 |
| CN | 109756690 A | * | 5/2019 | | |
| CN | 109922231 A | * | 6/2019 | | |
| CN | 110341511 A | * | 10/2019 | .............. | B60L 53/14 |
| CN | 110392282 A | * | 10/2019 | | |
| CN | 111372087 A | * | 7/2020 | ........... | G06T 3/4007 |
| CN | 111626936 A | * | 9/2020 | ........... | G06T 3/4038 |
| KR | 20190009588 A | * | 1/2019 | | |

* cited by examiner

| a | 0.5 | 1.0 | 1.5 | 2.0 | 2.5 | 3.0 | 3.5 | 4 |
|---|-----|-----|-----|-----|-----|-----|-----|---|
| b | 0 | | 1.0 | | 2.0 | | 3.0 | |
| c | 0.375 | | 1.125 | | 1.875 | | 2.625 | |

PANORAMIC VIDEO FRAME INTERPOLATION METHOD AND APPARATUS, AND CORRESPONDING STORAGE MEDIUM

TECHNICAL FIELD

The present invention relates to the technical field of image processing, in particular to a panoramic video frame interpolation method and apparatus and a corresponding storage medium.

BACKGROUND

With the development of science and technology, people have higher and higher requirements for video images. Therefore, some companies have developed various panoramic video processing methods to meet people's requirements for high-quality video images.

When a user creates a slow-motion panoramic video, in order to provide the fluency of the slow-motion panoramic video, the video frame rate of the panoramic video needs to be improved, that is, a frame interpolation operation needs to be performed on the original panoramic video. An existing panoramic video frame interpolation method directly estimates frame-interpolated video frames through classical algorithms based on neural networks such as Flownet-S, Flownet-C or Lite-flownet, which occupies a large amount of system memory and has a low estimation accuracy of the frame-interpolated video frames.

Therefore, it is necessary to provide a panoramic video frame interpolation method and a panoramic video frame interpolation apparatus, so as to solve the problems existing in the prior art.

SUMMARY

Embodiments of the present invention provide a panoramic video frame interpolation method and a panoramic video frame interpolation apparatus which occupy less system memory and have a high estimation accuracy of frame-interpolated video frames, so as to solve the technical problem that an existing panoramic video frame interpolation method and panoramic video frame interpolation apparatus occupy a large amount of system memory and have a low estimation accuracy of the frame-interpolated video frames during estimation of the frame-interpolated video frames.

An embodiment of the present invention provides a panoramic video frame interpolation method, including:
performing downsampling processing on a panoramic video pre-frame image to obtain a downsampling pre-frame image; performing the downsampling processing on a panoramic video post-frame image to obtain a downsampling post-frame image;
inputting the downsampling pre-frame image and the downsampling post-frame image to a preset optical flow estimation neural network to output a pre-post frame image optical flow graph and a post-pre frame image optical flow graph;
calculating an image optical flow graph before frame interpolation and an image optical flow graph after frame interpolation based on a frame interpolation position, the pre-post frame image optical flow graph and the post-pre frame image optical flow graph;
performing an inverse transformation operation on the downsampling post-frame image by using the pre-post frame image optical flow graph to obtain a downsampling pre-frame image after transformation, and performing the inverse transformation operation on the downsampling pre-frame image by using the post-pre frame image optical flow graph to obtain a downsampling post-frame image after transformation;
inputting the downsampling pre-frame image, the downsampling post-frame image, the pre-post frame image optical flow graph, the post-pre frame image optical flow graph, the image optical flow graph before frame interpolation, the image optical flow graph after frame interpolation, the downsampling pre-frame image after transformation and the downsampling post-frame image after transformation to a preset optical flow correction neural network to output a pre-post frame image correction optical flow graph, a post-pre frame image correction optical flow graph and an image occlusion relationship graph;
correcting the downsampling pre-frame image by using the pre-post frame image correction optical flow graph to obtain a downsampling pre-frame image after correction; correcting the downsampling post-frame image by using the post-pre frame image correction optical flow graph to obtain a downsampling post-frame image after correction;
performing upsampling processing on the image optical flow graph before frame interpolation to obtain an upsampling image optical flow graph before frame interpolation, and performing the upsampling processing on the image optical flow graph after frame interpolation to obtain an upsampling image optical flow graph after frame interpolation; and
calculating a frame interpolation image corresponding to the frame interpolation position by using the downsampling pre-frame image after correction, the downsampling post-frame image after correction, the image occlusion relationship graph, the upsampling image optical flow graph before frame interpolation and the upsampling image optical flow graph after frame interpolation.

An embodiment of the present invention further provides a panoramic video frame interpolation apparatus, including:
a downsampling processing module, configured to perform downsampling processing on a panoramic video pre-frame image to obtain a downsampling pre-frame image, and perform the downsampling processing on a panoramic video post-frame image to obtain a downsampling post-frame image;
an optical flow graph output module, configured to input the downsampling pre-frame image and the downsampling post-frame image to a preset optical flow estimation neural network to output a pre-post frame image optical flow graph and a post-pre frame image optical flow graph;
a frame-interpolation optical flow graph calculation module, configured to calculate an image optical flow graph before frame interpolation and an image optical flow graph after frame interpolation based on a frame interpolation position, the pre-post frame image optical flow graph and the post-pre frame image optical flow graph;
an inverse transformation module, configured to perform an inverse transformation operation on the downsampling post-frame image by using the pre-post frame image optical flow graph to obtain a downsampling pre-frame image after transformation, and perform the inverse transformation operation on the downsampling pre-frame image by using the post-pre frame image optical flow graph to obtain a downsampling post-frame image after transformation;

an optical flow correction module, configured to input the downsampling pre-frame image, the downsampling post-frame image, the pre-post frame image optical flow graph, the post-pre frame image optical flow graph, the image optical flow graph before frame interpolation, the image optical flow graph after frame interpolation, the downsampling pre-frame image after transformation and the downsampling post-frame image after transformation to a preset optical flow correction neural network to output a pre-post frame image correction optical flow graph, a post-pre frame image correction optical flow graph and an image occlusion relationship graph;

an image correction module, configured to correct the downsampling pre-frame image by using the pre-post frame image correction optical flow graph to obtain a downsampling pre-frame image after correction, and correct the downsampling post-frame image by using the post-pre frame image correction optical flow graph to obtain a downsampling post-frame image after correction;

an upsampling processing module, configured to perform upsampling processing on the image optical flow graph before frame interpolation to obtain an upsampling image optical flow graph before frame interpolation, and perform the upsampling processing on the image optical flow graph after frame interpolation to obtain an upsampling image optical flow graph after frame interpolation; and a frame-interpolation image generation module, configured to calculate a frame interpolation image corresponding to the frame interpolation position by using the downsampling pre-frame image after correction, the downsampling post-frame image after correction, the image occlusion relationship graph, the upsampling image optical flow graph before frame interpolation and the upsampling image optical flow graph after frame interpolation.

An embodiment of the present invention further provides a computer readable storage medium, storing a processor executable instruction, and the instruction is loaded by one or more processors to execute any above panoramic video frame interpolation method.

Compared with the panorama video frame interpolation method and the panorama video frame interpolation apparatus in the prior art, the panorama video frame interpolation method and the panorama video frame interpolation apparatus of the present invention perform a frame interpolation operation based on the optical flow graphs of the panorama video pre-frame image and the panorama video post-frame image, which can effectively reduce the system memory consumption and have a high accuracy in estimating the frame-interpolated video frames, and effectively solve the technical problem that the existing panoramic video frame interpolation method and panoramic video frame interpolation apparatus occupy a large amount of system memory and have a low estimation accuracy of the frame-interpolated video frames during estimation of the frame-interpolated video frames.

BRIEF DESCRIPTION OF THE DRAWINGS

FIG. 6 is a schematic diagram of upsampling processing of an image optical flow graph before frame interpolation.

DETAILED DESCRIPTION

Please refer to the figures, the same component symbols represent the same components, and the principle of the present invention is illustrated by implementing it in an appropriate calculating environment. The following description is based on the illustrated specific embodiments of the present invention, which should not be considered as a limitation to other specific embodiments of the present invention not detailed herein.

In the following description, the specific embodiments of the present invention will be described with reference to the steps and symbols of the operation executed by one or more computers, unless otherwise described. Therefore, it will be possible to understand these steps and operations, several of which are referred to as being executed by a computer, including manipulation by a computer processing unit representing an electronic signal of data in a structured form. This manipulation converts the data or maintains it at a position in a memory system of the computer, which may be reconfigured or otherwise change the operation of the computer in a manner familiar to those skilled in the art. The data structure maintained by the data is the physical position of the memory, which has specific characteristics defined by the data format. However, the principle of the present invention is described in the above words, which does not represent a limitation. Those skilled in the art will learn that the following multiple steps and operations may also be implemented in hardware.

A panoramic video frame interpolation method and a panoramic video frame interpolation apparatus of the present invention may be arranged in any electronic device to perform a frame interpolation operation on a panoramic video image, so as to form a fluent panoramic video with a high frame rate. The electronic devices include, but are not limited to wearable devices, headset devices, medical and health platforms, personal computers, server computers, handheld or laptop devices, mobile devices (such as mobile phones, personal digital assistants (PDAs) and media players), multiprocessor systems, consumer electronic devices, minicomputers, mainframe computers, distributed computing environments including any of the above systems or devices, and so on. The panoramic video frame interpolation apparatus is preferably an image processing terminal or an image processing server that performs the frame interpolation operation on the panoramic video image. The panoramic video frame interpolation apparatus performs the frame interpolation operation based on optical flow graphs of a panoramic video pre-frame image and a panoramic video post-frame image, which can effectively reduce the system memory consumption and has a high estimation accuracy of frame-interpolated video frames.

Figure 1:
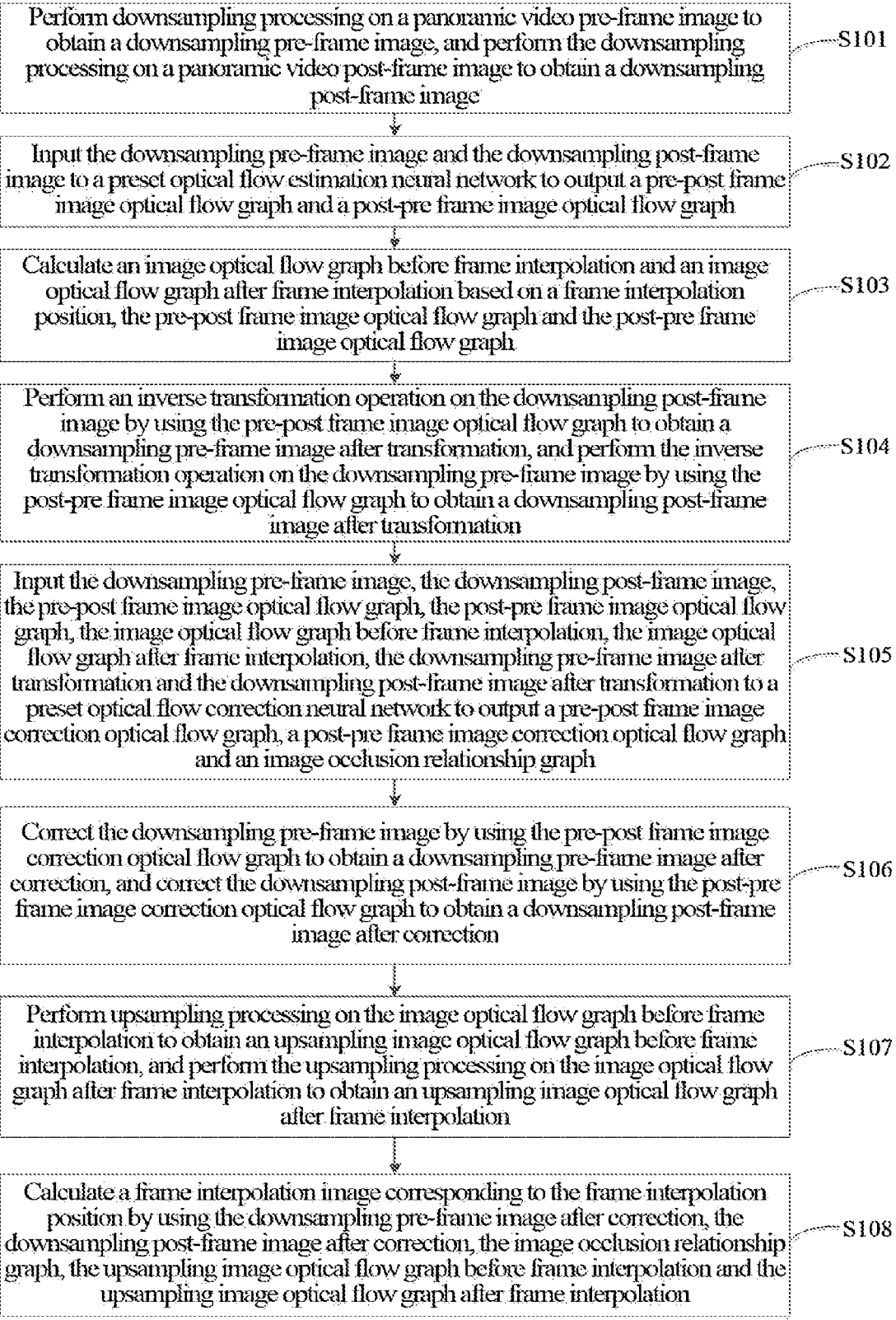
FIG. 1 is a frame interpolation operation flow of an embodiment of a panoramic video frame interpolation method of the present invention.

Please refer to FIG. 1, which is a frame interpolation operation flow of an embodiment of a panoramic video frame interpolation method of the present invention. The panoramic video frame interpolation method of the embodiment may be implemented by using the above electronic devices, and the panoramic video frame interpolation method of the embodiment includes:

step S101, downsampling processing is performed on a panoramic video pre-frame image to obtain a downsampling pre-frame image, and the downsampling processing is performed on a panoramic video post-frame image to obtain a downsampling post-frame image;

step S102, the downsampling pre-frame image and the downsampling post-frame image are input to a preset optical flow estimation neural network to output a pre-post frame image optical flow graph and a post-pre frame image optical flow graph;

step S103, an image optical flow graph before frame interpolation and an image optical flow graph after frame interpolation are calculated based on a frame interpolation position, the pre-post frame image optical flow graph and the post-pre frame image optical flow graph;

step S104, an inverse transformation operation is performed on the downsampling post-frame image by using the pre-post frame image optical flow graph to obtain a downsampling pre-frame image after transformation, and the inverse transformation operation is performed on the downsampling pre-frame image by using the post-pre frame image optical flow graph to obtain a downsampling post-frame image after transformation;

step S105, the downsampling pre-frame image, the downsampling post-frame image, the pre-post frame image optical flow graph, the post-pre frame image optical flow graph, the image optical flow graph before frame interpolation, the image optical flow graph after frame interpolation, the downsampling pre-frame image after transformation and the downsampling post-frame image after transformation are input to a preset optical flow correction neural network to output a pre-post frame image correction optical flow graph, a post-pre frame image correction optical flow graph and an image occlusion relationship graph;

step S106, the downsampling pre-frame image is corrected by using the pre-post frame image correction optical flow graph to obtain a downsampling pre-frame image after correction, and the downsampling post-frame image is corrected by using the post-pre frame image correction optical flow graph to obtain a downsampling post-frame image after correction;

step S107, upsampling processing is performed on the image optical flow graph before frame interpolation to obtain an upsampling image optical flow graph before frame interpolation, and the upsampling processing is performed on the image optical flow graph after frame interpolation to obtain an upsampling image optical flow graph after frame interpolation; and step S108, a frame interpolation image corresponding to the frame interpolation position is calculated by using the downsampling pre-frame image after correction, the downsampling post-frame image after correction, the image occlusion relationship graph, the upsampling image optical flow graph before frame interpolation and the upsampling image optical flow graph after frame interpolation.

A panoramic video frame interpolation process of the panoramic video frame interpolation method in the embodiment is described in detail below.

In step S101, a panoramic video frame interpolation apparatus (such as an image processing terminal) obtains a panoramic video pre-frame image and a panoramic video post-frame image, and subsequently needs to perform the frame interpolation operation on the panoramic video pre-frame image and the panoramic video post-frame image.

Then, the panoramic video frame interpolation apparatus performs the downsampling processing on the panoramic video pre-frame image to obtain the downsampling pre-frame image. For example, a panoramic video pre-frame picture is divided into two parts by a horizontal central line of the panoramic video pre-frame image, and each part is a downsampling pre-frame image. Because a resolution of the downsampling pre-frame image is low, an image processing velocity can be increased, and the memory is saved.

At the same time, the panoramic video frame interpolation apparatus performs the downsampling processing on the panoramic video post-frame image to obtain the downsampling post-frame image.

In step S102, the panoramic video frame interpolation apparatus inputs the downsampling pre-frame image and the downsampling post-frame image to the preset optical flow estimation neural network, so that the preset optical flow estimation neural network outputs the pre-post frame image optical flow graph and the post-pre frame image optical flow graph.

Optical flow refers to an instantaneous velocity of pixel motion of a space moving object on an imaging plane. Through the optical flow, a corresponding relationship between a previous image frame and a current image frame may be found by using the changes in a time domain of pixels in an image sequence and the correlation between adjacent frames, so as to calculate motion information of the object between the adjacent image frames.

The optical flow graph refers to a two-dimensional instantaneous velocity field composed of all pixels in the image. A two-dimensional velocity vector is a projection of a three-dimensional velocity vector of visible points in the image on the imaging plane. Therefore, the optical flow graph may include the motion information of the observed object and three-dimensional structure information of the observed object.

Here, through the preset optical flow estimation neural network, the panoramic video frame interpolation apparatus may calculate the post-pre frame image optical flow graph from pixel points of the downsampling pre-frame image to corresponding pixel points of the downsampling post-frame image, and the post-pre frame image optical flow graph from pixel points of the downsampling post-frame image to corresponding pixel points of the downsampling pre-frame image.

In step S103, the panoramic video frame interpolation apparatus calculates the image optical flow graph before frame interpolation and the image optical flow graph after frame interpolation based on the frame interpolation position, the pre-post frame image optical flow graph and the post-pre frame image optical flow graph.

A plurality of frame interpolation images may be uniformly arranged between the panoramic video pre-frame image and the panoramic video post-frame image. Therefore, the frame interpolation position of the frame interpolation image may be determined through the frame number different between the frame interpolation image and the panoramic video pre-frame image and between the frame interpolation image and the panoramic video post-frame image.

Figure 2:
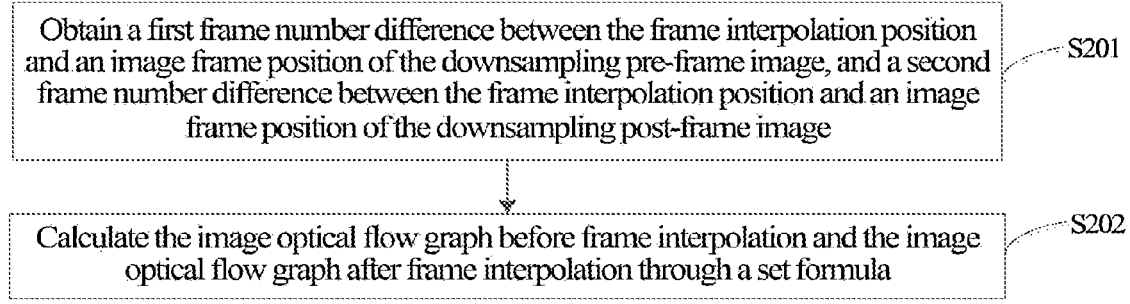
FIG. 2 is a flow chart of step S103 of an embodiment of a panoramic video frame interpolation method of the present invention.

Therefore, please refer to FIG. 2, which is a flow chart of step S103 of an embodiment of a panoramic video frame interpolation method of the present invention. Step S103 includes:

step S201, the panoramic video frame interpolation apparatus obtains a first frame number difference between the frame interpolation position and an image frame position of the downsampling pre-frame image, and a second frame number difference between the frame interpolation position and an image frame position of the downsampling post-frame image.

If three frame interpolation images are arranged between the downsampling pre-frame image and the downsampling post-frame image (a quadruple frame interpolation operation), the first frame number difference between a first frame interpolation image and the downsampling pre-frame image is one, and the second frame number difference between the first frame interpolation image and the downsampling post-frame image is three; the first frame number difference between a second frame interpolation image and the downsampling pre-frame image is two, and the second frame number difference between the second frame interpolation image and the downsampling post-frame image is two; and the first frame number difference between a third frame interpolation image and the downsampling pre-frame image is three, and the second frame number difference between the third frame interpolation image and the downsampling post-frame image is one.

Step S202, the panoramic video frame interpolation apparatus calculates the image optical flow graph before frame interpolation and the image optical flow graph after frame interpolation through the following formula.

$$F_{t \to 1} = t(t-1)F_{1 \to 2} + t^2 F_{2 \to 1}$$

$$F_{t \to 2} = (t-1)^2 F_{1 \to 2} + t(t-1)F_{2 \to 1}$$

$$t = \frac{t_1}{t_1 + t_2}$$

where, $F_{t \to 1}$ is the image optical flow graph before frame interpolation, $F_{t \to 2}$ is the image optical flow graph after frame interpolation, $t_1$ is the first frame number difference, $t_2$ is the second frame number difference, $F_{1 \to 2}$ is the pre-post frame image optical flow graph, and $F_{2 \to 1}$ is the post-pre frame image optical flow graph. Here, the image optical flow graph before frame interpolation is the optical flow graph from pixel points of the frame interpolation image to corresponding pixel points of the downsampling pre-frame image, and the image optical flow graph after frame interpolation is the optical flow graph from the pixel points of the frame interpolation image to corresponding pixel points of the downsampling post-frame image.

In step S104, the panoramic video frame interpolation apparatus performs the inverse transformation operation on the downsampling post-frame image by using the pre-post frame image optical flow graph obtained in step S102 to obtain a downsampling pre-frame image after transformation, and performs the inverse transformation operation on the downsampling pre-frame image by using the post-pre image optical flow graph obtained in step S102 to obtain a downsampling post-frame image after transformation.

Here, the inverse transformation operation refers to a warp operation, namely a warp transformation operation, in an image processing field. Please refer to FIG. 3a, which is a schematic diagram of a transformation operation from a pre-frame image to a post-frame image. A pixel point A (4, 2) in the pre-frame image is transferred into a pixel point A (4, 3) in the post-frame image through the transformation operation, and a pixel point B (1, 3) in the pre-frame image is transferred into a pixel point B (1, 2) in the post-frame image through the transformation operation. Therefore, the optical flow corresponding to the pixel point A (4, 2) in the pre-frame image is (0, 1), the optical flow corresponding to the pixel point B (1, 3) in the pre-frame image is (0, −1), and then the transformation operation is performed on each pixel in the pre-frame image to obtain the pre-post frame image optical flow graph.

Figure 3A:
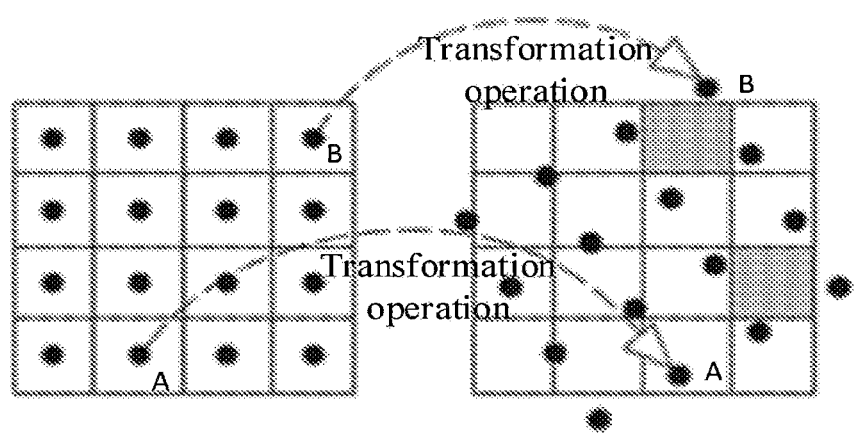
FIG. 3a is a schematic diagram of a transformation operation from a pre-frame image to a post-frame image.
Figure 3B:
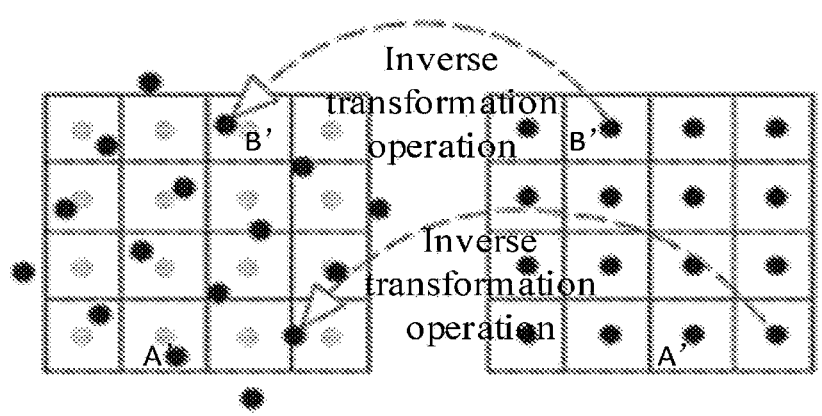
FIG. 3b is a schematic diagram of a pre-frame image after transformation obtained by an inverse transformation operation of a post-frame image based on a pre-post frame image optical flow graph.

Please refer to FIG. 3b, which is a schematic diagram of a pre-frame image after transformation obtained by an inverse transformation operation of a post-frame image based on a pre-post frame image optical flow graph. A pixel point B' (1, 2) in the post-frame image is transferred to a pixel point B' (1, 3) in the pre-frame image through the inverse transformation operation, and a pixel point A' (4, 3) in the post-frame image is transferred to a pixel point A' (4, 2) in the pre-frame image through the inverse transformation operation. In this way, the pre-frame image after transformation may be obtained through inverse transformation based on the pre-post frame image optical flow graph in combination with linear interpolation and a nearest neighbor operation, as shown in FIG. 3b.

It can be seen from the pixel points in FIG. 3a and FIG. 3b that when the inverse transformation operation is performed on the image, the pre-post frame image optical flow graph and the post-pre frame image optical flow graph often exceed an image edge, which causes that the inverse transformation operation of part of image edge pixels cannot be performed. Therefore, in this step, it is necessary to perform an edge filling operation on the downsampling post-frame image and the downsampling pre-frame image.

Figure 4A:
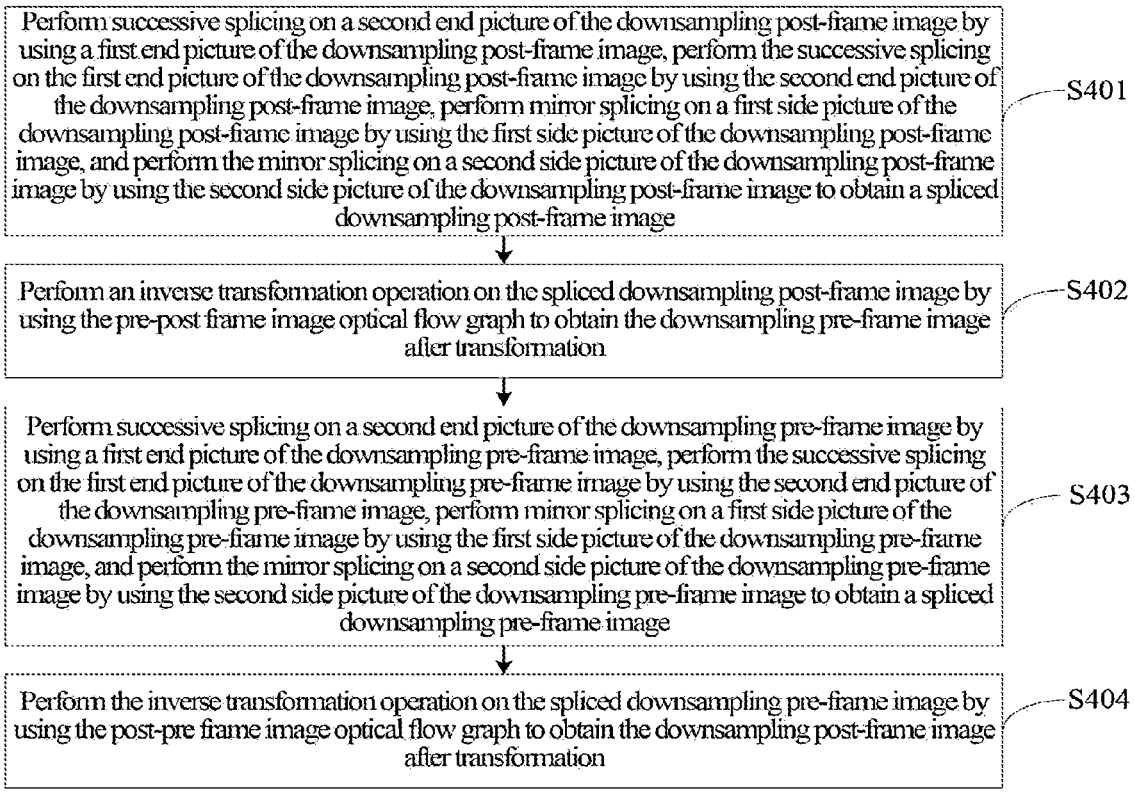
FIG. 4a is a flow chart of step S104 of an embodiment of a panoramic video frame interpolation method of the present invention.

For details, please refer to FIG. 4a, which is a flow chart of step S104 of an embodiment of a panoramic video frame interpolation method of the present invention. Step S104 includes:

step S401, since a first end picture 41 (horizontal end picture) and a second end picture 42 (horizontal end picture) of the downsampling post-frame image are successive (360-degree panorama), the panoramic video frame interpolation apparatus performs successive splicing on the second end picture 42 of the downsampling post-frame image by using the first end picture 41 of the downsampling post-frame image, and meanwhile performs successive splicing on the first end picture 41 of the downsampling post-frame image by using the second end picture 42 of the downsampling post-frame image.

Figure 4B:
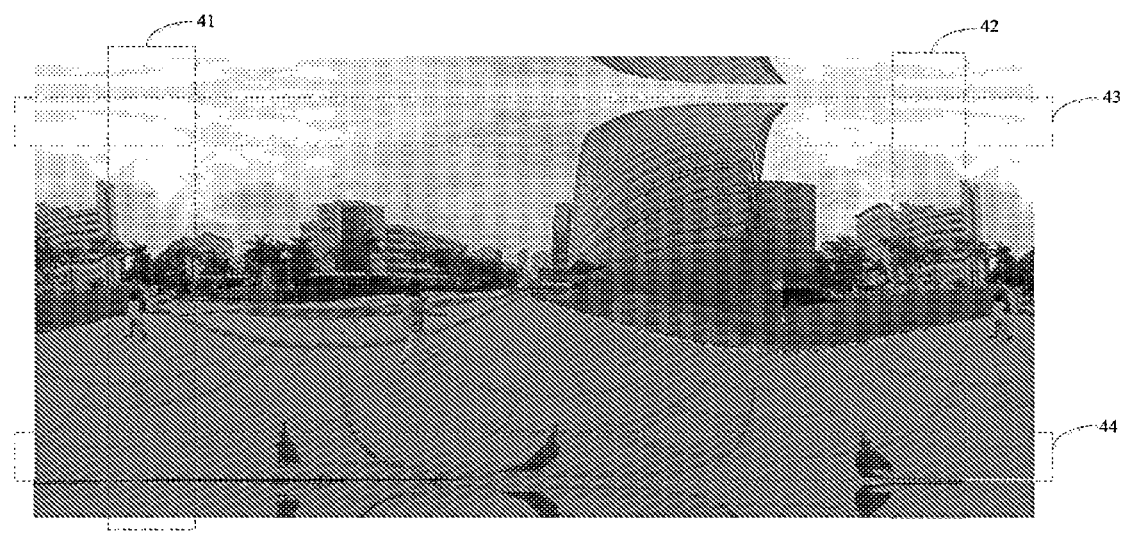
FIG. 4b is a schematic diagram of successive splicing and mirror splicing in step S104 of an embodiment of a panoramic video frame interpolation method of the present invention.

Here, the successive splicing refers to that the second end picture 42 is successively spliced to the outside of the first end picture 41 at a panoramic display angle, and meanwhile the first end picture 41 is successively spliced to the outside of the second end picture 42 at the panoramic display angle. In this way, the succession of images in the first end picture 41 and the second end picture 42 can be ensured, specifically as shown in FIG. 4*b*.

Since a first side picture 43 (perpendicular end picture) and a second side picture 44 (perpendicular end picture) of the downsampling post-frame image are not successive, the panoramic video frame interpolation apparatus performs mirror splicing on the first side picture 43 of the downsampling post-frame image by using the first side picture 43 of the downsampling post-frame image, and meanwhile performs the mirror splicing on the second side picture 44 of the downsampling post-frame image by using the second side picture 44 of the downsampling post-frame image.

Here, the mirror splicing refers to that the first side picture 43 is subjected to mirror processing with a first side edge as a central axis, and then is spliced to the outside of the first side picture 43, that is, an image of the outside of the first side picture 43 and an image of the inside of the first side picture 43 are mirror images relative to the first side edge. Similarly, the second side picture 44 is subjected to mirror processing with a second side edge as the central axis, and then is spliced to the outside of the second side picture 44. In this way, the succession of images in the first side picture 43 and the second side picture 44 can be ensured, specifically as shown in FIG. 4*b*.

A first end, a second end, a first side and a second side of the downsampling post-frame image are all spliced to obtain the spliced downsampling post-frame image.

Step S402, the panoramic video frame interpolation apparatus performs the inverse transformation operation on the spliced downsampling post-frame image obtained in step S401 by using the pre-post frame image optical flow graph to obtain the downsampling pre-frame image after transformation.

Step S403, the panoramic video frame interpolation apparatus performs the successive splicing on the second end picture of the downsampling pre-frame image by using the first end picture of the downsampling pre-frame image, and meanwhile performs the successive splicing on the first end picture of the downsampling pre-frame image by using the second end picture of the downsampling pre-frame image.

The panoramic video frame interpolation apparatus performs the mirror splicing on the first side picture of the downsampling pre-frame image by using the first side picture of the downsampling pre-frame image, and meanwhile performs the mirror splicing on the second side picture of the downsampling pre-frame image by using the second side picture of the downsampling pre-frame image.

A first end, a second end, a first side and a second side of the downsampling pre-frame image are all spliced to obtain the spliced downsampling pre-frame image.

Step S404, the panoramic video frame interpolation apparatus performs the inverse transformation operation on the spliced downsampling pre-frame image obtained in step S403 by using the post-pre frame image optical flow graph to obtain the downsampling post-frame image after transformation.

The downsampling pre-frame image after transformation may be used to correct the downsampling pre-frame image, and the downsampling post-frame image after transformation may be used to correct the downsampling post-frame image.

In step S105, the panoramic video frame interpolation apparatus inputs the downsampling pre-frame image and the downsampling post-frame image obtained in step S101, the pre-post frame image optical flow graph and the post-pre frame image optical flow graph obtained in step S102, the image optical flow graph before frame interpolation and the image optical flow graph after frame interpolation obtained in step S103, and the downsampling pre-frame image after transformation and the downsampling post-frame image after transformation obtained in step S104 to a preset optical flow correction neural network.

The preset optical flow correction neural network is obtained by training positive and negative samples of a panoramic video frame interpolation picture, and may output correction optical flow graphs and an occlusion relationship graph of the pre-post frame image by inputting the above parameters. Here the occlusion relationship graph refers to that when the frame interpolation image is generated, those pixel points of the pre-post frame picture may be displayed, and those pixel points need to be hidden, that is, the occlusion of the pixels in a motion video is processed.

Then, the preset optical flow correction neural network outputs the pre-post frame image correction optical flow graph, the post-pre frame image correction optical flow graph and the image occlusion relationship graph.

In step S106, the panoramic video frame interpolation apparatus corrects the downsampling pre-frame image by using the pre-post frame image correction optical flow graph obtained in step S105 to obtain a downsampling pre-frame image after correction. At the same time, the panoramic video frame interpolation apparatus corrects the downsampling post-frame image by using the post-pre frame image correction optical flow graph obtained in step S105 to obtain a downsampling post-frame image after correction.

The downsampling pre-frame image after correction and the downsampling post-frame image after correction may effectively avoid the loss of the pixel points during the frame interpolation operation, and may be matched with the corresponding optical flow graphs.

In step S107, the panoramic video frame interpolation apparatus performs upsampling processing on the image optical flow graph before frame interpolation to obtain an upsampling image optical flow graph before frame interpolation; and at the same time, the panoramic video frame interpolation apparatus performs the upsampling processing on the image optical flow graph after frame interpolation to obtain an upsampling image optical flow graph after frame interpolation.

Figure 5:
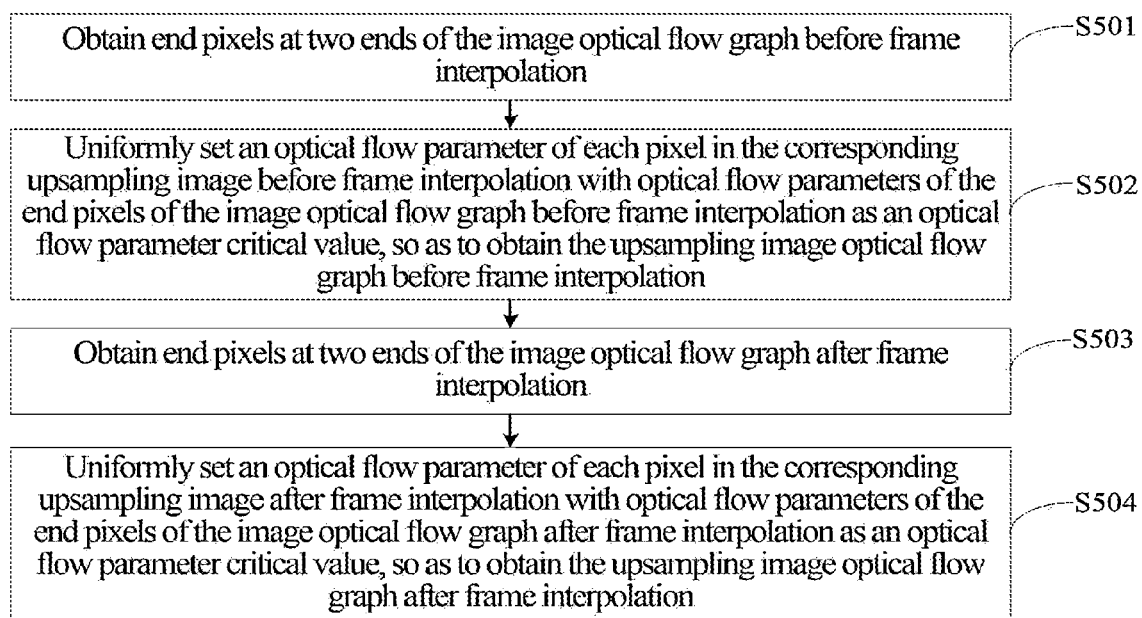
FIG. 5 is a flow chart of step S107 of an embodiment of a panoramic video frame interpolation method of the present invention.

Please refer to FIG. 5 for an upsampling process of the optical flow graph, which is a flow chart of step S107 of an embodiment of a panoramic video frame interpolation method of the present invention. Step S107 includes:

step S501, the panoramic video frame interpolation apparatus obtains end pixels at two ends of the image optical flow graph before frame interpolation.

Step S502, the panoramic video frame interpolation apparatus uniformly sets an optical flow parameter of each pixel in the corresponding upsampling image before frame interpolation with optical flow parameters of the end pixels of the image optical flow graph before frame interpolation as an optical flow parameter critical value, so as to obtain the upsampling image optical flow graph before frame interpolation.

Please refer to FIG. 6, which is a schematic diagram of upsampling processing of an image optical flow graph before frame interpolation. If it is necessary to perform upsampling on four pixels in each row of the image optical flow graph before frame interpolation to be eight pixels, a schematic diagram of a pixel arrangement of the image optical flow graph before frame interpolation is as shown in a row b in FIG. 6, an upsampling process of the prior art is as shown in a row a in FIG. 6, and an upsampling process of the embodiment is as shown in a row c in FIG. 6. Optical flow parameters of two end pixels in each row of the image optical flow graph before frame interpolation are set as two optical flow parameter critical values, and the two optical flow parameter critical values constitute an optical flow parameter critical range. Then the optical flow parameters of each row of pixels of the upsampling image before frame interpolation are uniformly set within the optical flow parameter critical range. Because each row of pixels of the upsampling image before frame interpolation are generated based on the optical flow parameter critical value and located within the optical flow parameter critical range, the estimation of the optical flow parameters for edge pixels of the upsampling image before frame interpolation can be effectively avoided, so that the offset of the pixel points of the frame interpolation image is avoided.

Step S503, the panoramic video frame interpolation apparatus obtains end pixels at two ends of the image optical flow graph after frame interpolation.

Step S504, the panoramic video frame interpolation apparatus uniformly sets an optical flow parameter of each pixel in the corresponding upsampling image after frame interpolation with optical flow parameters of the end pixels of the image optical flow graph after frame interpolation as an optical flow parameter critical value, so as to obtain the upsampling image optical flow graph after frame interpolation. See step S502 for a specific operation process.

In step S108, the panoramic video frame interpolation apparatus calculates a frame interpolation image corresponding to the frame interpolation position by using the downsampling pre-frame image after correction and the downsampling post-frame image after correction obtained in step S106, the image occlusion relationship graph obtained in step S105, and the upsampling image optical flow graph before frame interpolation and the upsampling image optical flow graph after frame interpolation obtained in step S107.

Specifically, the frame interpolation image corresponding to the frame interpolation position may be calculated through the following formula:

$$I_{out} = \frac{(1-t)V_{t\leftarrow 1} \odot \text{warp}(I_1, F_{t\rightarrow 1}') + tV_{t\leftarrow 2} \odot \text{warp}(I_2, F_{t\rightarrow 2}')}{(1-t)V_{t\leftarrow 1} + tV_{t\leftarrow 2}};$$

$$t = \frac{t_1}{t_1 + t_2};$$

where, $I_{out}$ is the frame interpolation image, $t_1$ is the first frame number difference, $t_2$ is the second frame number difference, $I_1$ is the downsampling pre-frame image after correction, $I_2$ is the downsampling post-frame image after correction, $F_{t\rightarrow 1}'$ is the upsampling image optical flow graph before frame interpolation, $F_{t\rightarrow 2}'$ is the upsampling image optical flow graph after frame interpolation, $V_{t\leftarrow 2}$ is an occlusion relationship between the frame interpolation image and a post-frame image in the image occlusion relationship, $V_{t\leftarrow 1}$ is an occlusion relationship between the frame interpolation image and a pre-frame image in the image occlusion relationship, warp refers to a warp transformation operation, and $\odot$ represents one-to-one multiplication of each element in a matrix or tensor.

Then, step S103 is executed again to transform the frame interpolation position to continue to calculate frame interpolation images of other frame interpolation positions.

In this way, the operation of arranging the frame interpolation image between the panoramic video pre-frame image and the panoramic video post-frame image is completed.

The panoramic video framing method of the embodiment performs the frame interpolation operation based on the panoramic video pre-frame image and the panoramic video post-frame image, which can effectively reduce the system memory consumption and has a high estimation accuracy of frame-interpolated video frames.

Figure 7:
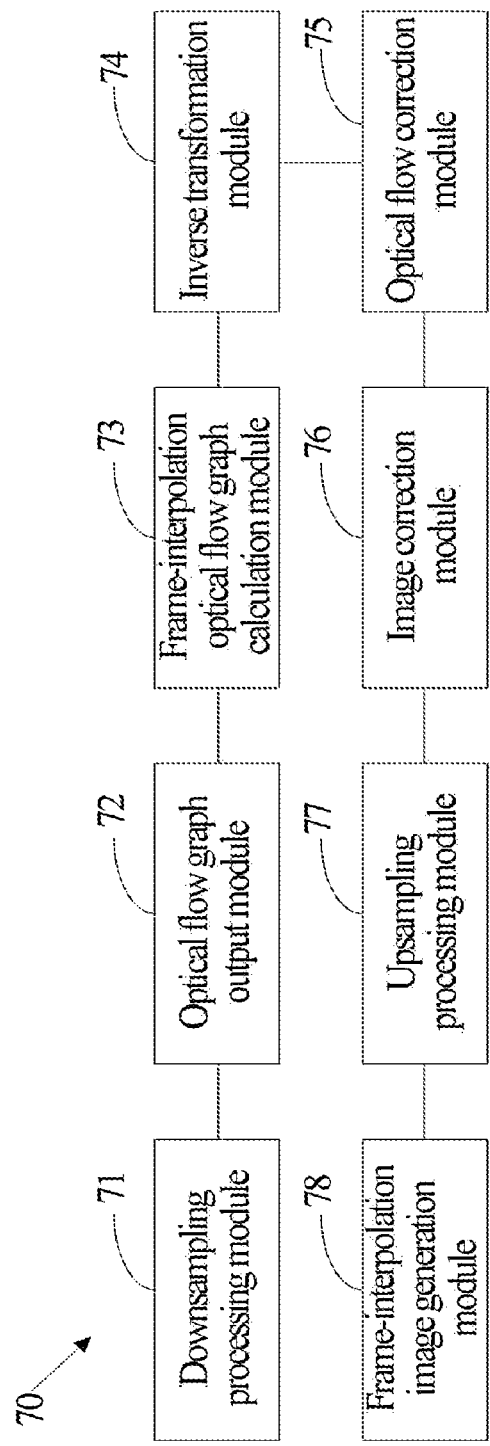
FIG. 7 is a schematic structural diagram of an embodiment of a panoramic video frame interpolation apparatus of the present invention.

The present invention further provides a panoramic video frame interpolation apparatus, please refer to FIG. 7, which is a schematic structural diagram of an embodiment of the panoramic video frame interpolation apparatus of the present invention. The panoramic video frame interpolation apparatus of the embodiment may be implemented by using the above panoramic video frame interpolation method, and the panoramic video frame interpolation apparatus 70 includes a downsampling processing module 71, an optical flow graph output module 72, a frame-interpolation optical flow graph calculation module 73, an inverse transformation module 74, an optical flow correction module 75, an image correction module 76, an upsampling processing module 77 and a frame-interpolation image generation module 78.

The downsampling processing module 71 is configured to perform downsampling processing on a panoramic video pre-frame image to obtain a downsampling pre-frame image, and perform the downsampling processing on a panoramic video post-frame image to obtain a downsampling post-frame image; the optical flow graph output module 72 is configured to input the downsampling pre-frame image and the downsampling post-frame image to a preset optical flow estimation neural network to output a pre-post frame image optical flow graph and a post-pre frame image optical flow graph; the frame-interpolation optical flow graph calculation module 73 is configured to calculate an image optical flow graph before frame interpolation and an image optical flow graph after frame interpolation based on a frame interpolation position, the pre-post frame image optical flow graph and the post-pre frame image optical flow graph; the inverse transformation module 74 is configured to perform an inverse transformation operation on the downsampling post-frame image by using the pre-post frame image optical flow graph to obtain a downsampling pre-frame image after transformation, and perform the inverse transformation operation on the downsampling pre-frame image by using the post-pre frame image optical flow graph to obtain a downsampling post-frame image after transformation; the optical flow correction module 75 is configured to input the downsampling pre-frame image, the downsampling post-frame image, the pre-post frame image optical flow graph, the post-pre frame image optical flow graph, the image optical flow graph before frame interpolation, the image optical flow graph after frame interpolation, the downsampling pre-frame image after transformation and the downsampling post-frame image after transformation to a preset optical flow correction neural network to output a pre-post frame image correction optical flow graph, a post-pre frame image correction optical flow graph and an image occlusion relationship graph; the image correction module 76 is configured to correct the downsampling pre-frame image by using the pre-post frame image correction optical flow graph to obtain a downsampling pre-frame image after correction, and correct the downsampling post-frame image by using the post-pre frame image correction optical flow graph to obtain a downsampling post-frame image after correction; the upsampling processing module 77 is configured to perform upsampling processing on the image optical flow graph before frame interpolation to obtain an upsampling image optical flow graph before frame interpolation, and perform the upsampling processing on the image optical flow graph after frame interpolation to obtain an upsampling image optical flow graph after frame interpolation; and the frame-interpolation image generation module 78 is configured to calculate a frame interpolation image corresponding to the frame interpolation position by using the downsampling pre-frame image after correction, the downsampling post-frame image after correction, the image occlusion relationship graph, the upsampling image optical flow graph before frame interpolation and the upsampling image optical flow graph after frame interpolation.

Figure 8:
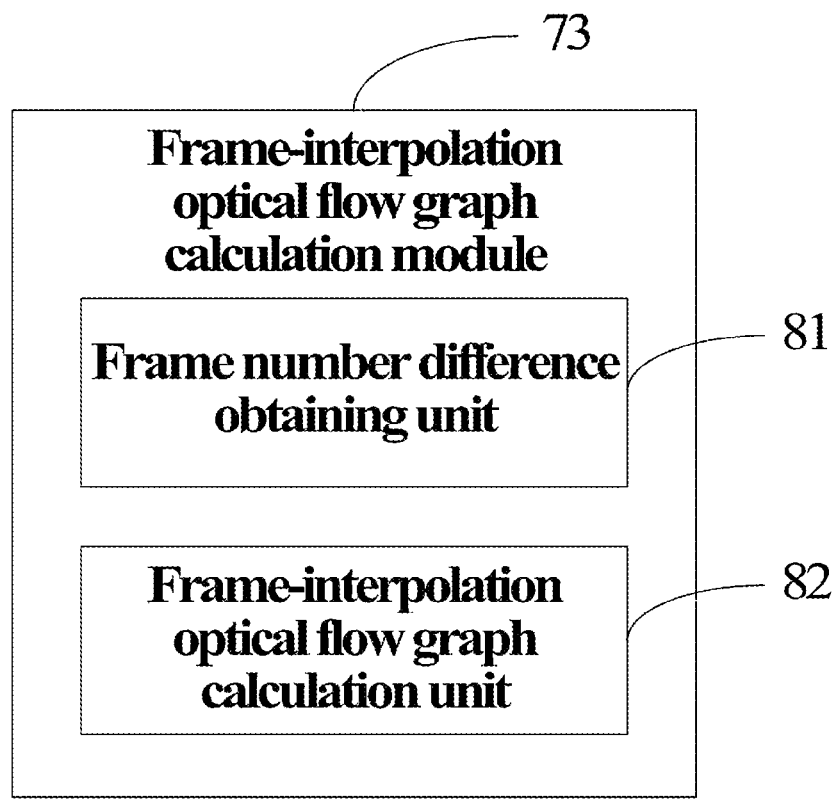
FIG. 8 is a schematic structural diagram of a frame-interpolation optical flow graph calculation module of an embodiment of a panoramic video frame interpolation apparatus of the present invention.

Please refer to FIG. 8, which is a schematic structural diagram of a frame-interpolation optical flow graph calculation module of an embodiment of the panoramic video frame interpolation apparatus of the present invention. The frame-interpolation optical flow graph calculation module 73 includes a frame number difference obtaining unit 81 and a frame-interpolation optical flow graph calculation unit 82.

The frame number difference obtaining unit 81 is configured to obtain a first frame number difference between the frame interpolation position and an image frame position of the downsampling pre-frame image, and a second frame number difference between the frame interpolation position and an image frame position of the downsampling post-frame image; and the frame-interpolation optical flow graph calculation unit 82 is configured to calculate the image optical flow graph before frame interpolation and the image optical flow graph after frame interpolation.

Figure 9:
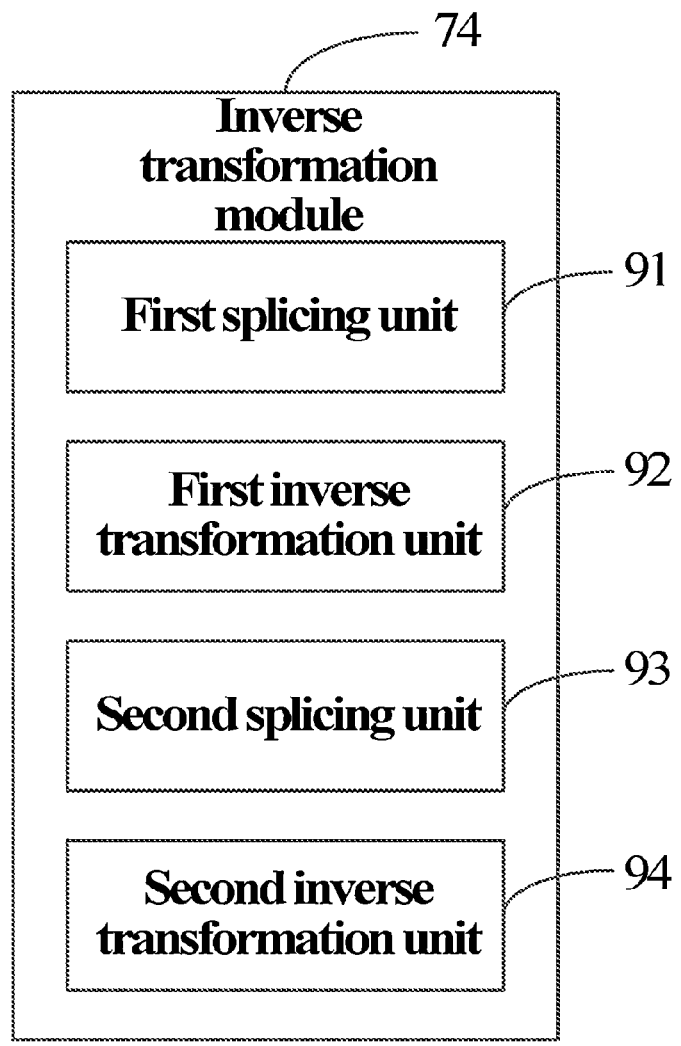
FIG. 9 is a schematic structural chart of an inverse transformation module of an embodiment of a panoramic video frame interpolation apparatus of the present invention.

Please refer to FIG. 9, which is a schematic structural diagram of an inverse transformation module of an embodiment of the panoramic video frame interpolation apparatus of the present invention. The inverse transformation module 74 includes a first splicing unit 91, a first inverse transformation unit 92, a second splicing unit 93 and a second inverse transformation unit 94.

The first splicing unit 91 is configured to perform successive splicing on a second end picture of the downsampling post-frame image by using a first end picture of the downsampling post-frame image, perform the successive splicing on the first end picture of the downsampling post-frame image by using the second end picture of the downsampling post-frame image, perform mirror splicing on a first side picture of the downsampling post-frame image by using the first side picture of the downsampling post-frame image, and perform the mirror splicing on a second side picture of the downsampling post-frame image by using the second side picture of the downsampling post-frame image to obtain a spliced downsampling post-frame image; the first inverse transformation unit 92 is configured to perform the inverse transformation operation on the spliced downsampling post-frame image by using the pre-post frame image optical flow graph to obtain the downsampling pre-frame image after transformation; the second splicing unit 93 is configured to perform the successive splicing on a second end picture of the downsampling pre-frame image by using a first end picture of the downsampling pre-frame image, perform the successive splicing on the first end picture of the downsampling pre-frame image by using the second end picture of the downsampling pre-frame image, perform the mirror splicing on a first side picture of the downsampling pre-frame image by using the first side picture of the downsampling pre-frame image, and perform the mirror splicing on a second side picture of the downsampling pre-frame image by using the second side picture of the downsampling pre-frame image to obtain a spliced downsampling pre-frame image; and the second inverse transformation module 94 is configured to perform the inverse transformation operation on the spliced downsampling pre-frame image by using the post-pre frame image optical flow graph to obtain the downsampling post-frame image after transformation.

Figure 10:
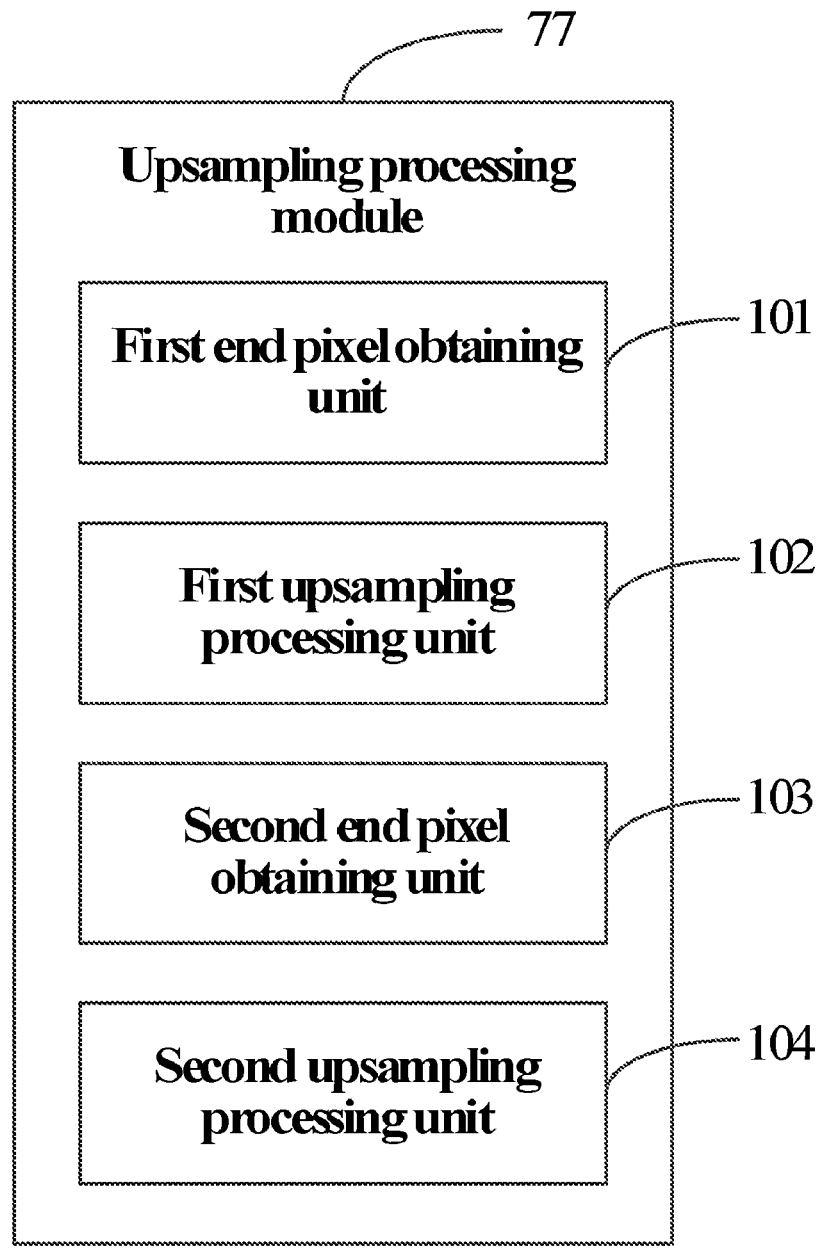
FIG. 10 is a schematic structural diagram of an upsampling processing module of an embodiment of a panoramic video frame interpolation apparatus of the present invention.

Please refer to FIG. 10, which is a schematic structural diagram of an upsampling processing module of an embodiment of the panoramic video frame interpolation apparatus of the present invention. The upsampling processing module 77 includes a first end pixel obtaining unit 101, a first upsampling processing unit 102, a second end pixel obtaining unit 103 and a second upsampling processing unit 104.

The first end pixel obtaining unit 101 is configured to obtain end pixels at two ends of the image optical flow graph before frame interpolation; the first upsampling processing unit 102 is configured to uniformly set an optical flow parameter of each pixel in the corresponding upsampling image before frame interpolation with optical flow parameters of the end pixels of the image optical flow graph before frame interpolation as an optical flow parameter critical value, so as to obtain the upsampling image optical flow graph before frame interpolation; the second end pixel obtaining unit 103 is configured to obtain end pixels at two ends of the image optical flow graph after frame interpolation; and the second upsampling processing unit 104 is configured to uniformly set an optical flow parameter of each pixel in the corresponding upsampling image after frame interpolation with optical flow parameters of the end pixels of the image optical flow graph after frame interpolation as an optical flow parameter critical value, so as to obtain the upsampling image optical flow graph after frame interpolation.

When the panoramic video frame interpolation apparatus 70 of the embodiment performs the frame interpolation image operation, the downsampling processing module 71 obtains a panoramic video pre-frame image and a panoramic video post-frame image, and subsequently needs to perform the frame interpolation operation on the panoramic video pre-frame image and the panoramic video post-frame image.

Then, the downsampling processing module 71 performs downsampling processing on the panoramic video pre-frame image to obtain the downsampling pre-frame image. For example, a panoramic video pre-frame picture is divided into two parts by a horizontal central line of the panoramic video pre-frame image, and each part is a downsampling pre-frame image. Because a resolution of the downsampling pre-frame image is low, an image processing speed can be increased, and the memory is saved.

At the same time, the downsampling processing module 71 performs the downsampling processing on the panoramic video post-frame image to obtain the downsampling post-frame image.

Then, the optical flow graph output module 72 inputs the downsampling pre-frame image and the downsampling post-frame image to the preset optical flow estimation neural network, so that the preset optical flow estimation neural network outputs the pre-post frame image optical flow graph and the post-pre frame image optical flow graph.

Then, the frame-interpolation optical flow graph calculation module 73 calculates the image optical flow graph before frame interpolation and the image optical flow graph after frame interpolation based on the frame interpolation position, the pre-post frame image optical flow graph and the post-pre frame image optical flow graph.

A specific process includes:
the frame number difference obtaining unit 81 of the frame-interpolation optical flow graph calculation module 73 obtains the first frame number difference between the frame interpolation position and the image frame position of the downsampling pre-frame image, and the second frame number difference between the frame interpolation position and the image frame position of the downsampling post-frame image.

The frame-interpolation optical flow graph calculation unit 82 of the frame-interpolation optical flow graph calculation module 73 calculates the image optical flow graph before frame interpolation and the image optical flow graph after frame interpolation through the following formula:

$$F_{t \to 1} = t(t-1)F_{1 \to 2} + t^2 F_{2 \to 1};$$

$$F_{t \to 2} = (t-1)^2 F_{1 \to 2} + t(t-1)F_{2 \to 1};$$

$$t = \frac{t_1}{t_1 + t_2};$$

where, $F_{t \to 1}$ is the image optical flow graph before frame interpolation, $F_{1 \to 2}$ is the image optical flow graph after frame interpolation, $t_1$ is the first frame number difference, $t_2$ is the second frame number difference, $F_{1 \to 2}$ is the pre-post frame image optical flow graph, and $F_{2 \to 1}$ is the post-pre frame image optical flow graph. Here, the image optical flow graph before frame interpolation is the optical flow graph from pixel points of the frame interpolation image to corresponding pixel points of the downsampling pre-frame image, and the image optical flow graph after frame interpolation is the optical flow graph from the pixel points of the frame interpolation image to corresponding pixel points of the downsampling post-frame image.

Then, the inverse transformation module 74 performs the inverse transformation operation on the downsampling post-frame image by using the pre-post frame image optical flow graph to obtain a downsampling pre-frame image after transformation, and performs the inverse transformation operation on the downsampling pre-frame image by using the post-pre image optical flow graph to obtain a downsampling post-frame image after transformation.

It can be seen from the pixel points in FIG. 3a and FIG. 3b that when the inverse transformation operation is performed on the image, the pre-post frame image optical flow graph and the post-pre frame image optical flow graph often exceed the image edge, which causes that the inverse transformation operation of part of image edge pixels cannot be performed. Therefore, it is necessary to perform an edge filling operation on the downsampling post-frame image and the downsampling pre-frame image.

A flow of the edge filling operation includes:
the first splicing unit 91 of the inverse transformation module 74 performs successive splicing on the second end picture of the downsampling pre-frame image by using the first end picture of the downsampling pre-frame image, and meanwhile performs the successive splicing on the first end picture of the downsampling pre-frame image by using the second end picture of the downsampling pre-frame image.

The first splicing unit 91 performs mirror splicing on the first side picture of the downsampling pre-frame image by using the first side picture of the downsampling pre-frame image, and meanwhile performs the mirror splicing on the second side picture of the downsampling pre-frame image by using the second side picture of the downsampling pre-frame image.

A first end, a second end, a first side and a second side of the downsampling post-frame image are all spliced to obtain the spliced downsampling post-frame image.

The first inverse transformation unit 92 of the inverse transformation module 74 performs the inverse transformation operation on the spliced downsampling post-frame image by using the pre-post frame image optical flow graph to obtain the downsampling pre-frame image after transformation.

The second splicing unit 93 of the inverse transformation module 74 performs successive splicing on the second end picture of the downsampling pre-frame image by using the first end picture of the downsampling pre-frame image, and meanwhile performs the successive splicing on the first end picture of the downsampling pre-frame image by using the second end picture of the downsampling pre-frame image.

The second splicing unit 93 performs mirror splicing on the first side picture of the downsampling pre-frame image by using the first side picture of the downsampling pre-frame image, and meanwhile performs the mirror splicing on the second side picture of the downsampling pre-frame image by using the second side picture of the downsampling pre-frame image.

A first end, a second end, a first side and a second side of the downsampling pre-frame image are all spliced to obtain the spliced downsampling pre-frame image.

The second inverse transformation unit 94 of the inverse transformation module 74 performs the inverse transformation operation on the spliced downsampling pre-frame image by using the post-pre frame image optical flow graph to obtain the downsampling post-frame image after transformation.

The downsampling pre-frame image after transformation may be used to correct the downsampling pre-frame image, and the downsampling post-frame image after transformation may be used to correct the downsampling post-frame image.

Then, the optical flow correction module 75 inputs the downsampling pre-frame image, the downsampling post-frame image, the pre-post frame image optical flow graph, the post-pre frame image optical flow graph, the image optical flow graph before frame interpolation, the image optical flow graph after frame interpolation, the downsampling pre-frame image after transformation and the downsampling post-frame image after transformation to a preset optical flow correction neural network.

The preset optical flow correction neural network is obtained by training positive and negative samples of a panoramic video frame interpolation picture, and may output a corrected optical flow graph and an occlusion relationship graph of the pre-post frame image by inputting the above parameters. Here, the occlusion relationship graph refers to that when the frame interpolation image is generated, those pixel points of the pre-post frame picture may be displayed, and those pixel points need to be hidden, that is, the occlusion of the pixels in a motion video is processed.

Then, the preset optical flow correction neural network outputs a pre-post frame image correction optical flow graph, a post-pre frame image correction optical flow graph and an image occlusion relationship graph.

Then, the image correction module 76 corrects the downsampling pre-frame image by using the pre-post frame image correction optical flow graph to obtain a downsampling pre-frame image after correction. At the same time, the downsampling post-frame image is corrected by using the post-pre frame image correction optical flow graph to obtain a downsampling post-frame image after correction.

The downsampling pre-frame image after correction and the downsampling post-frame image after correction may effectively avoid the loss of the pixel points during the frame interpolation operation, and may be matched with the corresponding optical flow graph.

Then, the upsampling processing module 77 performs upsampling processing on the image optical flow graph before frame interpolation to obtain an upsampling image optical flow graph before frame interpolation; and at the same time, the panoramic video frame interpolation apparatus performs the upsampling processing on the image optical flow graph after frame interpolation to obtain an upsampling image optical flow graph after frame interpolation.

A flow of the upsampling operation includes:

The first end pixel obtaining unit 101 of the upsampling processing module 77 obtains end pixels at two ends of the image optical flow graph before frame interpolation.

The first upsampling processing unit 102 of the upsampling processing module 77 uniformly sets an optical flow parameter of each pixel in the corresponding upsampling image before frame interpolation with optical flow parameters of the end pixels of the image optical flow graph before frame interpolation as an optical flow parameter critical value, so as to obtain the upsampling image optical flow graph before frame interpolation.

The second end pixel obtaining unit 103 of the upsampling processing module 77 obtains end pixels at two ends of the image optical flow graph after frame interpolation.

The second upsampling processing unit 104 of the upsampling processing module 77 uniformly sets an optical flow parameter of each pixel in the corresponding upsampling image after frame interpolation with optical flow parameters of the end pixels of the image optical flow graph after frame interpolation as an optical flow parameter critical value, so as to obtain the upsampling image optical flow graph after frame interpolation.

Then, the frame-interpolation image generation module 78 calculates a frame interpolation image corresponding to the frame interpolation position by using the downsampling pre-frame image after correction, the downsampling post-frame image after correction, the image occlusion relationship graph, the upsampling image optical flow graph before frame interpolation and the upsampling image optical flow graph after frame interpolation.

Specifically, the frame interpolation image corresponding to the frame interpolation position may be calculated through the following formula:

$$I_{out} = \frac{(1-t)V_{t\leftarrow 1} \odot \text{warp}(I_1, F_{t\rightarrow 1}') + tV_{t\leftarrow 2} \odot \text{warp}(I_2, F_{t\rightarrow 2}')}{(1-t)V_{t\leftarrow 1} + tV_{t\leftarrow 2}};$$

$$t = \frac{t_1}{t_1 + t_2};$$

where, $I_{out}$ is the frame interpolation image, $t_1$ is the first frame number difference, $t_2$ is the second frame number difference, $I_1$ is the downsampling pre-frame image after correction, $I_2$ is the downsampling post-frame image after correction, $F_{t\rightarrow 1}'$ is the upsampling image optical flow graph before frame interpolation, $F_{t\rightarrow 2}'$ is the upsampling image optical flow graph after frame interpolation, $V_{t\leftarrow 2}$ is an occlusion relationship between the frame interpolation image and a post-frame image in the image occlusion relationship, $V_{t\leftarrow 1}$ is an occlusion relationship between the frame interpolation image and a pre-frame image in the image occlusion relationship, warp refers to a warp transformation operation, and $\odot$ represents one-to-one multiplication of each element in a matrix or tensor.

Then, the frame-interpolation optical flow graph calculation module 73 is executed again to transform the frame interpolation position to continue to calculate frame interpolation images of other frame interpolation positions.

In this way, the operation of arranging the frame interpolation image between the panoramic video pre-frame image and the panoramic video post-frame image of the panoramic video frame interpolation apparatus of the embodiment is completed.

The specific working principle of the panoramic video frame interpolation apparatus of the embodiment is the same or similar to the description in the embodiment of the above panoramic video frame interpolation method. For details, please refer to the relevant description in the embodiment of the above panoramic video frame interpolation method.

The panoramic video framing apparatus of the embodiment performs the frame interpolation operation based on the panoramic video pre-frame image and the panoramic video post-frame image, which can effectively reduce the system memory consumption and has a high estimation accuracy of frame-interpolated video frames.

The panoramic video frame interpolation method and the panoramic video frame interpolation apparatus of the present invention perform frame interpolation and reconstruction operations based on the optical flow graph with a low resolution, input the optical flow graphs of the panoramic video pre-frame image and the panoramic video post-frame image, and perform frame interpolation at a resolution of an original image according to the optical flow graph. In this way, the high resolution of the obtained frame interpolation image can be ensured, the usage rate of the memory is reduced, and the amount of calculation of the frame interpolation operation is reduced.

The panorama video frame interpolation method and the panorama video frame interpolation apparatus of the present invention perform the frame interpolation operation based on the optical flow graphs of the panorama video pre-frame image and the panorama video post-frame image, which can effectively reduce the system memory consumption and have the high estimation accuracy of the frame-interpolated video frames, and effectively solve the technical problem that the existing panoramic video frame interpolation method and panoramic video frame interpolation apparatus occupy a large amount of system memory and have the low estimation accuracy of the frame-interpolated video frames during estimation of the frame-interpolated video frames.

Each functional unit in the embodiment of the present invention may be integrated into one processing module, or each unit may physically exist separately, or two or more units may be integrated into one module. The above integrated module may be implemented in the form of hardware or a software functional module. If the integrated modules are implemented in the form of software functional modules and are sold or used as independent products, the modules may also be stored in a computer readable storage medium. The storage medium mentioned above may be a read-only memory, a disk or an optical disk. The above each apparatus or system may execute the methods in the corresponding method embodiments.

To sum up, although the present invention has been disclosed as above based on the embodiments, the serial numbers before the embodiments are used merely for the convenience of description, and do not limit the order of each embodiment of the present invention. Moreover, the above embodiments are not intended to limit the present invention, and those ordinarily skilled in the art can make various changes and refinements without departing from the spirit and scope of the present invention. Therefore, the scope of protection of the present invention is subject to the scope defined in the claims.

What is claimed is:

1. A panoramic video frame interpolation method, comprising:
    performing downsampling processing on a panoramic video pre-frame image to obtain a downsampling pre-frame image; performing the downsampling processing on a panoramic video post-frame image to obtain a downsampling post-frame image;
    inputting the downsampling pre-frame image and the downsampling post-frame image to a preset optical flow estimation neural network to output a pre-post frame image optical flow graph and a post-pre frame image optical flow graph;
    calculating an image optical flow graph before frame interpolation and an image optical flow graph after frame interpolation based on a frame interpolation position, the pre-post frame image optical flow graph and the post-pre frame image optical flow graph;
    performing an inverse transformation operation on the downsampling post-frame image by using the pre-post frame image optical flow graph to obtain a downsampling pre-frame image after transformation; performing the inverse transformation operation on the downsampling pre-frame image by using the post-pre frame image optical flow graph to obtain a downsampling post-frame image after transformation;
    inputting the downsampling pre-frame image, the downsampling post-frame image, the pre-post frame image optical flow graph, the post-pre frame image optical flow graph, the image optical flow graph before frame interpolation, the image optical flow graph after frame interpolation, the downsampling pre-frame image after transformation and the downsampling post-frame image after transformation to a preset optical flow correction neural network to output a pre-post frame image correction optical flow graph, a post-pre frame image correction optical flow graph and an image occlusion relationship graph;
    correcting the downsampling pre-frame image by using the pre-post frame image correction optical flow graph to obtain a downsampling pre-frame image after correction; correcting the downsampling post-frame image by using the post-pre frame image correction optical flow graph to obtain a downsampling post-frame image after correction;
    performing upsampling processing on the image optical flow graph before frame interpolation to obtain an upsampling image optical flow graph before frame interpolation; performing the upsampling processing on the image optical flow graph after frame interpolation to obtain an upsampling image optical flow graph after frame interpolation; and
    calculating a frame interpolation image corresponding to the frame interpolation position by using the downsampling pre-frame image after correction, the downsampling post-frame image after correction, the image occlusion relationship graph, the upsampling image optical flow graph before frame interpolation and the upsampling image optical flow graph after frame interpolation.

2. The panoramic video frame interpolation method according to claim 1, wherein performing the inverse transformation operation on the downsampling post-frame image by using the pre-post frame image optical flow graph to obtain the downsampling pre-frame image after transformation includes:
    performing successive splicing on a second end picture of the downsampling post-frame image by using a first end picture of the downsampling post-frame image, performing successive splicing on the first end picture of the downsampling post-frame image by using the second end picture of the downsampling post-frame image, performing mirror splicing on a first side picture of the downsampling post-frame image by using the first side picture of the downsampling post-frame image, and performing mirror splicing on a second side picture of the downsampling post-frame image by using the second side picture of the downsampling post-frame image to obtain a spliced downsampling post-frame image;
    performing the inverse transformation operation on the spliced downsampling post-frame image by using the pre-post frame image optical flow graph to obtain the downsampling pre-frame image after transformation;
    performing the inverse transformation operation on the downsampling pre-frame image by using the post-pre frame image optical flow graph to obtain the downsampling post-frame image after transformation includes:
    performing successive splicing on a second end picture of the downsampling pre-frame image by using a first end picture of the downsampling pre-frame image, performing successive splicing on the first end picture of the downsampling pre-frame image by using the second end picture of the downsampling pre-frame image, performing mirror splicing on a first side picture of the downsampling pre-frame image by using the first side picture of the downsampling pre-frame image, and performing mirror splicing on a second side picture of the downsampling pre-frame image by using the second side picture of the downsampling pre-frame image to obtain a spliced downsampling pre-frame image; and
    performing the inverse transformation operation on the spliced downsampling pre-frame image by using the post-pre frame image optical flow graph to obtain the downsampling post-frame image after transformation.

3. The panoramic video frame interpolation method according to claim 1, wherein calculating the image optical flow graph before frame interpolation and the image optical flow graph after frame interpolation based on the frame interpolation position, the pre-post frame image optical flow graph and the post-pre frame image optical flow graph includes:
    obtaining a first frame number difference between the frame interpolation position and an image frame position of the downsampling pre-frame image, and a second frame number difference between the frame interpolation position and an image frame position of the downsampling post-frame image; and calculating the image optical flow graph before frame interpolation and the image optical flow graph after frame interpolation through the following formula:

$$F_{t \to 1} = t(t-1)F_{1 \to 2} + t^2 F_{2 \to 1};$$
$$F_{t \to 2} = (t-1)^2 F_{1 \to 2} + t(t-1)F_{2 \to 1};$$
$$t = \frac{t_1}{t_1 + t_2};$$

wherein, $F_{t \to 1}$ is the image optical flow graph before frame interpolation, $F_{t \to 2}$ is the image optical flow graph after frame interpolation, $t_1$ is the first frame number difference, $t_2$ is the second frame number difference, $F_{1 \to 2}$ is the pre-post frame image optical flow graph, and $F_{2 \to 1}$ is the post-pre frame image optical flow graph.

4. The panoramic video frame interpolation method according to claim 1, wherein the frame interpolation image corresponding to the frame interpolation position is calculated through the following formula:

$$I_{out} = \frac{(1-t)V_{t \leftarrow 1} \odot \text{warp}(I_1, F_{t \to 1}') + tV_{t \leftarrow 2} \odot \text{warp}(I_2, F_{t \to 2}')}{(1-t)V_{t \leftarrow 1} + tV_{t \leftarrow 2}};$$
$$t = \frac{t_1}{t_1 + t_2};$$

wherein, $I_{out}$ is the frame interpolation image, $t_1$ is the first frame number difference, $t_2$ is the second frame number difference, $I_1$ is the downsampling pre-frame image after correction, $I_2$ is the downsampling post-frame image after correction, $F_{t \to 1}'$ is the upsampling image optical flow graph before frame interpolation, $F_{t \to 2}'$ is the upsampling image optical flow graph after frame interpolation, $V_{t \leftarrow 2}$ is an occlusion relationship between the frame interpolation image and a post-frame image in the image occlusion relationship, $V_{t \leftarrow 1}$ is an occlusion relationship between the frame interpolation image and a pre-frame image in the image occlusion relationship, warp refers to a warp transformation operation, and $\odot$ represents one-to-one multiplication of each element in a matrix or tensor.

5. The panoramic video frame interpolation method according to claim 1, wherein performing the upsampling processing on the image optical flow graph before frame interpolation to obtain the upsampling image optical flow graph before frame interpolation includes:

obtaining end pixels at two ends of the image optical flow graph before frame interpolation; and uniformly setting an optical flow parameter of each pixel in the upsampling image optical flow graph before frame interpolation with optical flow parameters of the end pixels of the image optical flow graph before frame interpolation as an optical flow parameter critical value, so as to obtain the upsampling image optical flow graph before frame interpolation;

performing the upsampling processing on the image optical flow graph after frame interpolation to obtain the upsampling image optical flow graph after frame interpolation includes:

obtaining end pixels at two ends of the image optical flow graph after frame interpolation; and uniformly setting an optical flow parameter of each pixel in the upsampling image optical flow graph after frame interpolation with optical flow parameters of the end pixels of the image optical flow graph after frame interpolation as an optical flow parameter critical value, so as to obtain the upsampling image optical flow graph after frame interpolation.

6. A non-transitory computer readable storage medium, storing a processor executable instruction, wherein the instruction is loaded by one or more processors to execute the panoramic video frame interpolation method of claim 1.

7. A panoramic video frame interpolation apparatus, comprising:

a downsampling processing module, configured to perform downsampling processing on a panoramic video pre-frame image to obtain a downsampling pre-frame image, and perform the downsampling processing on a panoramic video post-frame image to obtain a downsampling post-frame image;

an optical flow graph output module, configured to input the downsampling pre-frame image and the downsampling post-frame image to a preset optical flow estimation neural network to output a pre-post frame image optical flow graph and a post-pre frame image optical flow graph;

a frame-interpolation optical flow graph calculation module, configured to calculate an image optical flow graph before frame interpolation and an image optical flow graph after frame interpolation based on a frame interpolation position, the pre-post frame image optical flow graph and the post-pre frame image optical flow graph;

an inverse transformation module, configured to perform an inverse transformation operation on the downsampling post-frame image by using the pre-post frame image optical flow graph to obtain a downsampling pre-frame image after transformation, and perform the inverse transformation operation on the downsampling pre-frame image by using the post-pre frame image optical flow graph to obtain a downsampling post-frame image after transformation;

an optical flow correction module, configured to input the downsampling pre-frame image, the downsampling post-frame image, the pre-post frame image optical flow graph, the post-pre frame image optical flow graph, the image optical flow graph before frame interpolation, the image optical flow graph after frame interpolation, the downsampling pre-frame image after transformation and the downsampling post-frame image after transformation to a preset optical flow correction neural network to output a pre-post frame image correction optical flow graph, a post-pre frame image correction optical flow graph and an image occlusion relationship graph;

an image correction module, configured to correct the downsampling pre-frame image by using the pre-post frame image correction optical flow graph to obtain a downsampling pre-frame image after correction, and correct the downsampling post-frame image by using the post-pre frame image correction optical flow graph to obtain a downsampling post-frame image after correction;

an upsampling processing module, configured to perform upsampling processing on the image optical flow graph before frame interpolation to obtain an upsampling image optical flow graph before frame interpolation, and perform the upsampling processing on the image optical flow graph after frame interpolation to obtain an upsampling image optical flow graph after frame interpolation; and a frame-interpolation image generation module, configured to calculate a frame interpolation image corresponding to the frame interpolation position by using the downsampling pre-frame image after correction, the downsampling post-frame image after correction, the image occlusion relationship graph, the upsampling image optical flow graph before frame interpolation and the upsampling image optical flow graph after frame interpolation.

8. The panoramic video frame interpolation apparatus according to claim 7, wherein the inverse transformation module comprises:

a first splicing unit, configured to perform successive splicing on a second end picture of the downsampling post-frame image by using a first end picture of the downsampling post-frame image, perform successive splicing on the first end picture of the downsampling post-frame image by using the second end picture of the downsampling post-frame image, perform mirror splicing on a first side picture of the downsampling post-frame image by using the first side picture of the downsampling post-frame image, and perform mirror splicing on a second side picture of the downsampling post-frame image by using the second side picture of the downsampling post-frame image to obtain a spliced downsampling post-frame image;

a first inverse transformation unit, configured to perform the inverse transformation operation on the spliced downsampling post-frame image by using the pre-post frame image optical flow graph to obtain the downsampling pre-frame image after transformation;

a second splicing unit, configured to perform successive splicing on a second end picture of the downsampling pre-frame image by using a first end picture of the downsampling pre-frame image, perform successive splicing on the first end picture of the downsampling pre-frame image by using the second end picture of the downsampling pre-frame image, perform mirror splicing on a first side picture of the downsampling pre-frame image by using the first side picture of the downsampling pre-frame image, and perform mirror splicing on a second side picture of the downsampling pre-frame image by using the second side picture of the downsampling pre-frame image to obtain a spliced downsampling pre-frame image; and a second inverse transformation module, configured to perform the inverse transformation operation on the spliced downsampling pre-frame image by using the post-pre frame image optical flow graph to obtain the downsampling post-frame image after transformation.

9. The panoramic video frame interpolation apparatus according to claim 7, wherein the frame-interpolation optical flow graph calculation module comprises:

a frame number difference obtaining unit, configured to obtain a first frame number difference between the frame interpolation position and an image frame position of the downsampling pre-frame image, and a second frame number difference between the frame interpolation position and an image frame position of the downsampling post-frame image; and a frame-interpolation optical flow graph calculation unit, configured to calculate the image optical flow graph before frame interpolation and the image optical flow graph after frame interpolation through the following formula:

$$F_{t \to 1} = t(t-1)F_{1 \to 2} + t^2 F_{2 \to 1};$$

$$F_{t \to 2} = (t-1)^2 F_{1 \to 2} + t(t-1)F_{2 \to 1};$$

$$t = \frac{t_1}{t_1 + t_2};$$

wherein, $F_{t \to 1}$ is the image optical flow graph before frame interpolation, $F_{t \to 1}$ is the image optical flow graph after frame interpolation, $t_1$ is the first frame number difference, $t_2$ is the second frame number difference, $F_{1 \to 2}$ is the pre-post frame image optical flow graph, and $F_{2 \to 1}$ is the post-pre frame image optical flow graph.

10. The panoramic video frame interpolation apparatus according to claim 7, wherein the frame interpolation image corresponding to the frame interpolation position is calculated through the following formula:

$$I_{out} = \frac{(1-t)V_{t \leftarrow 1} \odot \text{warp}(I_1, F_{t \to 1}') + tV_{t \leftarrow 2} \odot \text{warp}(I_2, F_{t \to 2}')}{(1-t)V_{t \leftarrow 1} + tV_{t \leftarrow 2}};$$

$$t = \frac{t_1}{t_1 + t_2};$$

wherein, $I_{out}$ is the frame interpolation image, $t_1$ is the first frame number difference, $t_2$ is the second frame number difference, $I_1$ is the downsampling pre-frame image after correction, $I_2$ is the downsampling post-frame image after correction, $F_{t \to 1}'$ is the upsampling image optical flow graph before frame interpolation, $F_{t \to 2}'$ is the upsampling image optical flow graph after frame interpolation, $V_{t \leftarrow 2}$ is an occlusion relationship between the frame interpolation image and a post-frame image in the image occlusion relationship, $V_{t \leftarrow 1}$ is an occlusion relationship between the frame interpolation image and a pre-frame image in the image occlusion relationship, warp refers to a warp transformation operation, $\odot$ and represents one-to-one multiplication of each element in a matrix or tensor.

11. The panoramic video interpolation apparatus according to claim 7, wherein the upsampling processing module comprises:

a first end pixel obtaining unit, configured to obtain end pixels at two ends of the image optical flow graph before frame interpolation;

a first upsampling processing unit, configured to uniformly set an optical flow parameter of each pixel in the upsampling image optical flow graph before frame interpolation with optical flow parameters of the end pixels of the image optical flow graph before frame interpolation as an optical flow parameter critical value, so as to obtain the upsampling image optical flow graph before frame interpolation;

a second end pixel obtaining unit, configured to obtain end pixels at two ends of the image optical flow graph after frame interpolation; and a second upsampling processing unit, configured to uniformly set an optical flow parameter of each pixel in the upsampling image optical flow graph after frame interpolation with optical flow parameters of the end pixels of the image optical flow graph after frame interpolation as an optical flow parameter critical value, so as to obtain the upsampling image optical flow graph after frame interpolation.

* * * * *